Figure 3:
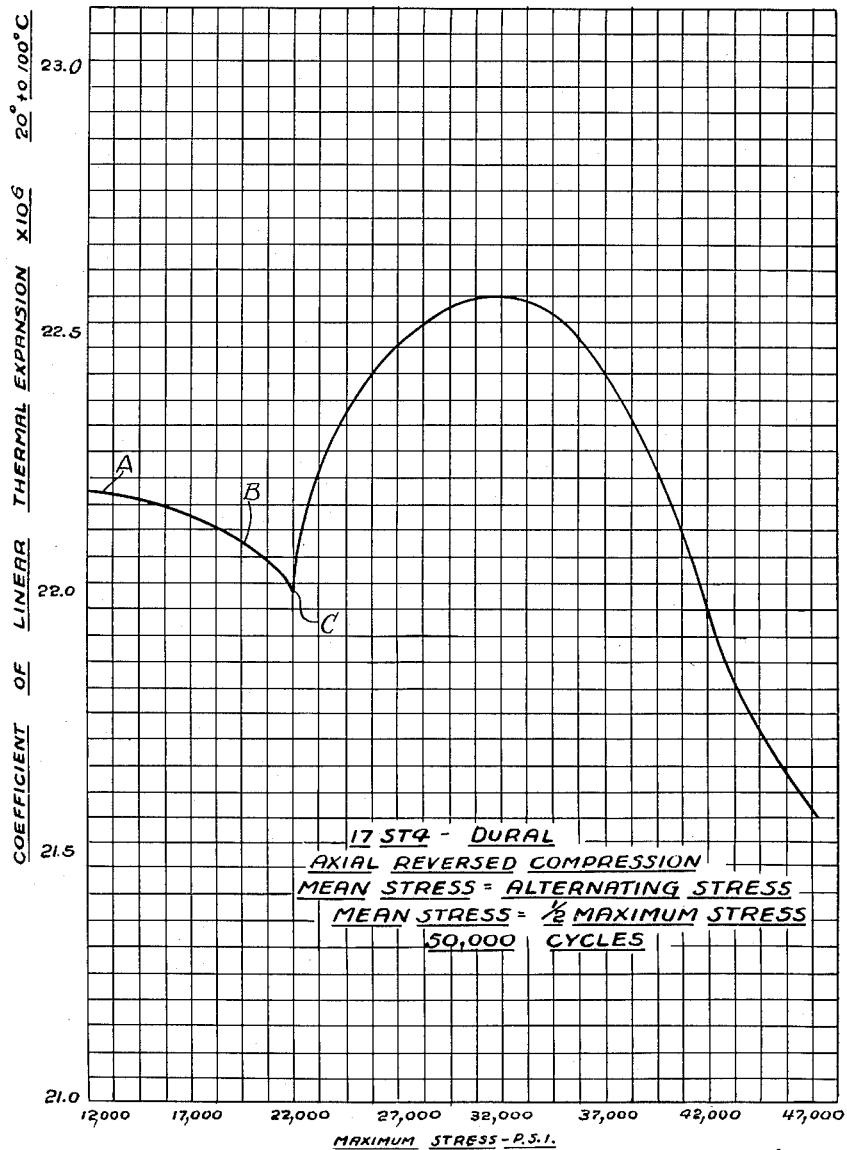

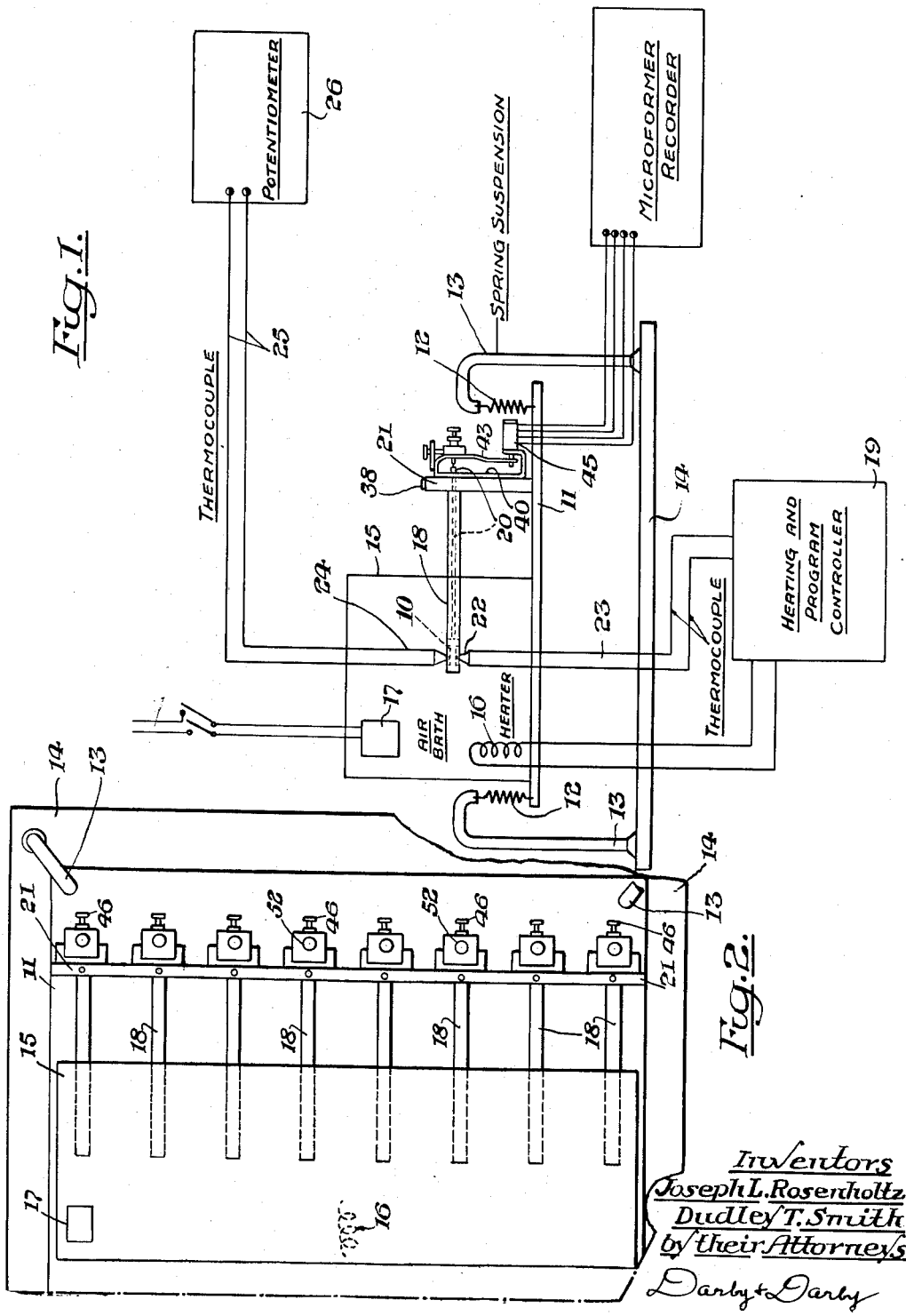

United States Patent Office 2,729,096
Patented Jan. 3, 1956

2,729,096

METHOD FOR DETERMINING THE FATIGUE ENDURANCE LIMIT OF SOLIDS, ESPECIALLY METALS

Joseph L. Rosenholtz, Troy, and Dudley T. Smith, Watervliet, N. Y., assignors to Rensselaer Polytechnic Institute, Troy, N. Y., a corporation of New York Application October 16, 1951, Serial No. 251,542

13 Claims. (Cl. 73—15.6)

The present invention relates to a method for determining the endurance limit of a solid material such for example as steel and particularly to such a method which may be performed in a minimum of time. The invention also relates to certain apparatus used in connection with the method. The endurance limit has been defined (see Seeley, Resistance of Materials, page 288) as the maximum unit stress that can be repeated through a definite cycle or range of stress an indefinitely large number of times without causing the material to rupture.

At the present time the endurance limit of materials is determined by placing test bars of the material in a testing machine and operating the machine until the material ruptures. This may require continuous operation for a period of three months or more. To reach the point of rupture not infrequently requires such a great length of time that it has become common practice to operate the machine through 500,000,000 cycles of stress application and to then determine the actual endurance limit by extrapolation from a stress versus cycle curve.

Additionally, the present methods of determination of endurance limit are extremely time consuming since it is necessary that a considerable number of test specimens be used in order to obtain a reasonably accurate result.

Our method of determining endurance limit of a metal or other solid requires subjecting each of a plurality of test specimens to a particular value of the desired stress; all specimens receiving the same number of reversals, which number is usually not more than 200,000 cycles and frequently is as little as 10,000 cycles, followed by a comparative measurement of the linear expansion of the test specimens when subjected to a rise in temperature of from 1° C. to 100° C. though usually in the smaller range of from 20° C. to 80° C. and a plotting of the computed coefficients of linear thermal expansion versus the applied stress.

This method can be followed and results obtained in a period of approximately three hours for the most difficult case and frequently in an even lesser amount of time.

Although we prefer the measurement of linear expansion to determine the endurance limit of the material, we have found that other physical properties of the material can be utilized as the basis for determination. As examples of such physical properties, electrical resistance, electrical conductance, electrical impedance, yield point, proportional limit, ultimate stress, magnetostriction, core loss, and magnetic permeability may be mentioned.

It is an object of the invention to provide a method of determining the endurance limit of solid materials in a very short period of time thus eliminating the necessity for extensive installations of expensive testing machines, making it possible for relatively unskilled labor to perform the tests, and reducing the cost of labor to perform such tests.

It is another object of the invention to provide a method of determining the endurance limit as mentioned above wherein the apparatus necessary is relatively simple and inexpensive.

It is a still further object of the invention to provide such a method which is applicable to the determination of the endurance limit whether the applied stress be tension, compression, bending, torsion or any combination thereof.

Figure 4:
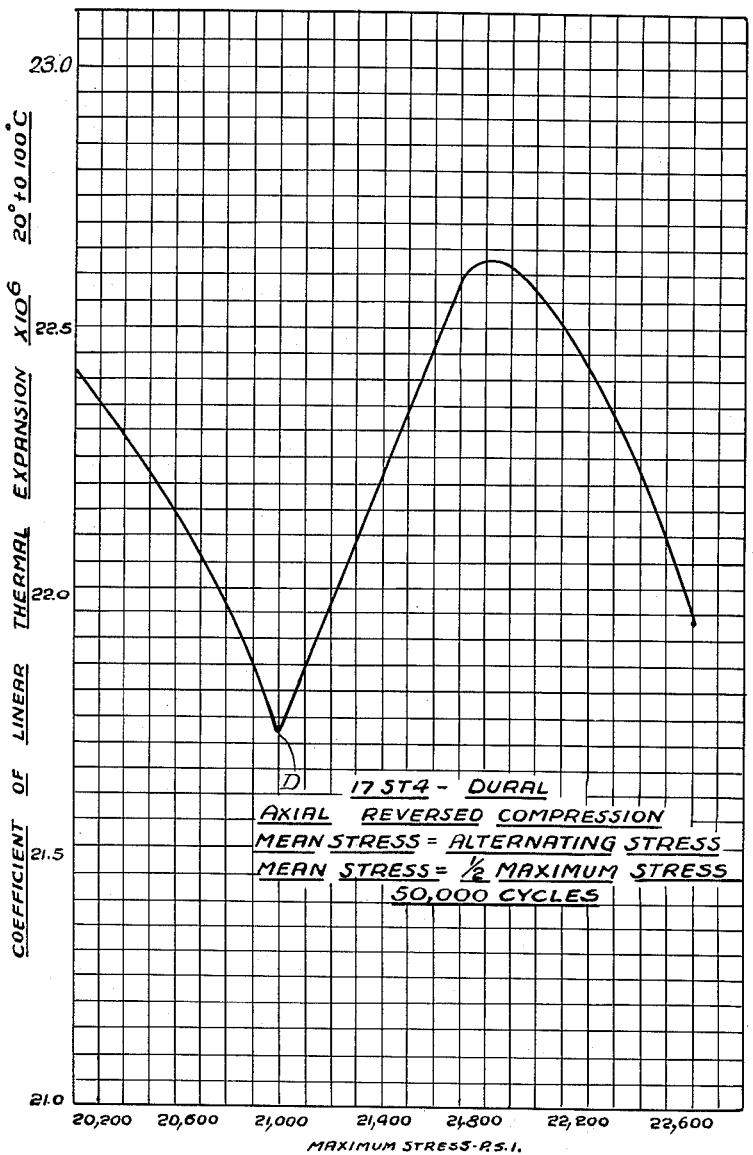

Other objects and features of the invention will be apparent when the following description is considered in connection with the annexed drawings, in which, Figure 1 is a schematic diagram of the apparatus used in making an accurate determination of the linear expansion of test specimens;

Figure 2 is a top plan view of the apparatus shown in Figure 1;

Figure 3 is a curve showing the coefficient of linear thermal expansion of 17ST4 Duralumin plotted against applied stress. The particular stress to which the test specimens were subjected was alternating tension and compression exerted axially, the mean stress being zero; and Figure 4 is a curve similar to that of Figure 3 showing the results of tests made within a more limited range of stress to thereby yield a more accurate final result.

In general the method consists of the following steps:

1. Test bars of the particular solid to be tested are prepared in accordance with the usual established practices in the field of fatigue testing, dimensions of the bars varying depending upon the characteristics of the fatigue machine in which they are to be tested.

2. A series of such test bars of a particular solid are subjected to stress such as tension, compression, torsion or bending or to a combination of such stresses as for example alternate tension and compression.

Each bar in the series is subjected to a relatively small number of stress cycles such as 100,000, although in many instances a lesser number, for example, 10,000 cycles is sufficient and in some instances a larger number such as 200,000 cycles may be desirable. It should be noted that in the prior practice it is necessary to subject some specimens to as much as 500,000,000 cycles to establish the endurance limit requiring months of operation of the fatigue testing machines, whereas even the usual upper limit of 100,000 cycles can be applied to the specimens in a matter of a few hours.

As stated above, each bar is subjected to the same desired type of stress loading. However, the bars of the series are loaded to a different extent, the loading increasing preferably in substantially regular increments from a low value to some arbitrary value either above or usually somewhat below the proportional limit or yield point of the solid. The values of proportional limit or yield point may of course be predetermined by standard static testing methods. The upper limit of the range would be the point of failure of the solid. However, it is wasteful of time to go much beyond the proportional limit or yield point and therefore this value forms the practical upper limit. On the other hand, if the upper limit of the stress range is too much below the yield point or proportional limit it might yield an indeterminate result.

The stress increment between the bars in the series under test will be determined by the number of dilatometers available. As will appear later we have found that 7 or 8 dilatometers are sufficient to reduce the testing time to a very low value although a single dilatometer might be utilized if the reduction in time resulting was sufficient, but greater care and precision would be necessary since this would not be a comparison method.

3. After each of the bars in the series has been subjected to the desired type of fatigue stress, the bars are mounted in clamps or otherwise prepared for insertion in the dilatometer and zero readings are taken, these readings being normally with the bars at room temperature of approximately 20° C.

4. If a group of dilatometers is used, the bars are then simultaneously heated by means of an air bath or other suitable heating means to an elevated temperature which may be 100° C. or may, in many instances, be substantially less, for example, 40° C.

5. When the temperature in the heating chamber is stabilized at the desired elevated temperature, readings are again taken of the dilatometers so that the total amount of linear thermal expansion may be determined.

If a bank of dilatometers is used as indicated above and they are adjusted to give uniform magnifications, then the amounts of expansion of the several testing bars can be obtained without computation. If the dilatometers are not adjusted to give uniform magnifications then simple computations will be necessary. With a recording dilatometer, which is preferred, the measured distance between the initial and final points of record is the quantity desired. For extreme accuracy, however, it is preferred to supply each dilatometer with its own thermocouple and to compute the coefficient of linear thermal expansion rather than to utilize the expansion measurements directly.

6. The dilations are then plotted on a curve, Fig. 3, as a function of their respective applied stress intensities; the dilations may, as indicated above, be plotted as amounts of expansion or preferably as coefficients of linear expansion. The curve resulting will show a relatively sharp rise beginning at the endurance limit which is at the cusp C. At stress values below the endurance limit, the curve may be nearly flat as at A—B or may slope as at B—C toward the endurance limit stress value. The stress point at which the slope of the curve changes abruptly, i. e., the endurance limit may show considerable variation for the same material depending upon the nature of the stress or stresses which were applied to the test specimens.

7. The above procedure indicates the approximate value of the endurance limit. For certain purposes this value may be sufficiently accurate and no further testing be necessary. For other purposes, when this approximation has been established, a second series of test bars may be utilized to give a more accurate indication of the endurance limit. In this event, a second series of test bars exactly similar to the first is prepared and subjected to the same desired type of stress. However, the stress increments between bars are arranged so that they are very small and lie on either side of the approximate endurance limit established by the first series as shown in the comparison of Figs. 3 and 4. The stress increment may, for example, be as low as 50 pounds per square inch.

8. As a further check on the accuracy of the endurance value determined, the dilatometers may be cooled to room temperature and a second set of dilation records obtained. This may be done for either the first series of test bars mentioned or for the second. This second set of dilation records will give a measure of the recovery of each of the test bars and such recoveries are approximately proportional to the expansion changes for some types of stress loading. It should be noted that compression specimens in general have a positive recovery and tensile specimens a negative recovery. Under combined stress loadings recovery may be either positive or negative or zero depending upon the stress ratio of the two imposed combined stresses.

The entire testing process should preferably be conducted in a controlled air-conditioned room so that the initial and final temperatures will be identical and so that the cooling process may be expedited. However, this is not a necessary condition to the testing.

Although an understanding of the theory is not necessary in order that the method outlined above be successfully performed, a statement of what we believe is a proper explanation may be helpful.

As stresses are imposed from a low value up to the endurance limit of the material, plastic deformation begins in some of the crystals and becomes progressively greater as the endurance limit is approached. A sudden permanent contraction of the crystal lattice occurs exactly at the endurance limit which contraction affects the physical properties of the material. A similar structural collapse also occurs in non-crystalline material such as plastics. At stresses beyond the endurance limit plastic deformation continues and has the effect of increasing the crystal lattice dimensions. This continues up to a point where extensive deformation occurs prior to failure. At failure general collapse occurs. Each of the changes above mentioned produces residual stress which reflect the applied stress intensities and which display themselves on a typical curve of linear thermal expansion versus stress and likewise on the typical curves of other physical properties, such for example as electrical resistance, plotted against stress.

Before describing specific examples of the determination of the endurance limit as outlined above, the apparatus which we have found preferable will be described. This apparatus comprises a plurality of dilatometers together with certain indicating and recording apparatus all shown in Figures 1 and 2. Although dilatometers are preferable, it is to be understood that other properties than linear thermal expansion may be measured, such measurements being made with ordinary test equipment for the particular property, and it is to be further understood that for the measurement of the linear thermal expansion other measuring devices such, by way of example, as micrometers, dial gages or strain gages may be substituted for dilatometers.

Referring now to Figure 1, a platform 11 is suspended by means of springs 12 from brackets 13 which are in turn mounted upon any suitable support as for example the table 14. Mounted upon the platform 11 is a cabinet 15 which contains a heater element 16 and a fan 17. Extending into this cabinet are the ends of dilatometer quartz tubes and rods 18 and 20, the tubes 18 being supported in the upstanding bracket 21 which is in turn fixedly mounted on the platform 11. A thermocouple 22 is fixed in position against one of the specimens 10 and is connected by means of the wires 23 to a heating and program controller 19 which regulates the temperature of the heater 16 and effects heating of the interior of the cabinet 15 through the desired temperature range. Additional thermocouples 24 are provided, one for each dilatometer, these thermocouples being connected to the specimens and by means of the respective wires 25 to a potentiometer 26 graduated in degrees so that the exact temperature of each test specimen may be determined by switching the potentiometer 26 to the pair of leads 25 associated with that specimen.

Each dilatometer comprises quartz tube 18 previously mentioned together with a quartz rod 20 mounted for reciprocation within the tube 18.

Fixed to the bracket 21 is a magnification lever supporting means 40. Each support 40 carries a horizontal arm of a magnification lever 43 extending downwardly in front of the corresponding quartz rod 20 and each lever at its lower end is connected with the movable core of a small transformer 45. As is indicated in Figure 1, leads from the transformer 45 extend to a recorder. In the form of recorder which we have utilized there are provided a number of transformers equal to the number of dilatometers and each of these transformers is connected to one of the transformers 45, the arrangement being such that movement of the core causes an unbalance in the circuit including the two transformers which causes actuation of a servomotor which operates an indicating stylus and at the same time operates the recorder transformer to cause its moving core to assume a position identical with that of the cooperating transformer 45.

The apparatus above described is utilized by placing the test specimens in the tube 18 and adjusting levers 43 to equally magnify the movement of corresponding quartz rods 20 and then with the test specimens within the cabinet 15, taking an initial reading on the recorder for each rod. Thereafter the heating and program controller 19 is set in operation to elevate the temperature in the cabinet to a desired level and when the condition within the cabinet has become stable at that desired level new readings from the recorder are taken to indicate the amount of linear thermal expansion of each of the test specimens. Although these recorded values of expansion may be plotted directly against the applied stress for each specimen, it is often preferable to utilize the indication of each of the thermocouples 24 in connection with the reading of expansion for the same specimen and plot the coefficients of expansion as a function of the applied stress rather than the absolute expansions. Any possibility of error arising due to uneven heating of the different specimens is thus avoided.

In order that our method may be entirely clear the exact steps followed in determining the endurance limit of Duralumin of the type known as 17ST4 and of annealed steel of the type known as 1090 will be described. In the case of Duralumin the physical property utilized as a basis for determination of the endurance limit was the coefficient of linear expansion whereas in the case of the steel the basis for determination was the electrical resistance of the material.

Eight test specimens of Duralumin 17ST4 were prepared, the specimens having the shape shown at 10 in Figure 5. These specimens were formed from round rod having a diameter in the turned-down central section of 7/32" and a length of that section of 2".

The specimens were then placed in a Baldwin-Southwark fatigue testing machine manufactured by the Sontag Scientific Corporation and subjected to an axially reversed compressive stress, the mean stress being one half of the maximum stress. The first specimen was subjected to a stress of 12,000 pounds per square inch, the second specimen was subjected to a stress of 17,000 pounds per square inch, the third specimen was subjected to 22,000 pounds per square inch, the fourth specimen was subjected to 27,000 pounds per square inch, the fifth specimen was subjected to 32,000 pounds per square inch, the sixth specimen was subjected to 37,000 pounds per square inch, the seventh specimen was subjected to 42,000 pounds per square inch, and the eighth specimen was subjected to 47,000 pounds per square inch. A single testing machine was utilized for stressing all of the specimens sequentially.

The above stress increments were made equal for convenience but as seen from Fig. 3 varying stress increments can be used. For example, from this figure it is seen that the second specimen could have been stressed at, say, 16,700 p. s. i. and similarly the third specimen could have been stressed at 22,500 p. s. i. and so on for the other specimens.

The eight specimens were then placed in the manner previously described in the cabinet 15, each having been previously mounted in one of the dilatometer clamps. Initial readings were then taken of the lengths of the various specimens. In the particular instance these readings were taken at a temperature of 20° C., the entire testing equipment being located in an air-conditioned space maintained at that temperature. Thereafter the heating and program controller 19 was set to cause the temperature within the cabinet 15 to rise to 100° C. and when the temperature had stabilized at that point new readings of the lengths of the various test specimens were taken, each reading being taken simultaneously with the reading of the associated thermocouple. Coefficients of expansion were then computed and plotted against the stress in pounds per square inch which had been applied to each specimen. The resulting curve is shown in Figure 3 and the dip therein occurring at 22,000 p. s. i. occurs at the approximate endurance limit, that is, the endurance limit of 17ST4 Duralumin subjected to axially reversed compressive stress is approximately 22,000 pounds per square inch.

In order to secure a value for the endurance limit which is accurate within a narrower range, a second series of specimens identical with the first was prepared save that in this instance seven rather than eight specimens were utilized. These seven specimens were subjected to the same type of stress, namely, axially reversed compression. The values of stress applied to the different specimens were as follows:

1. 20,200 pounds per square inch
2. 20,600 pounds per square inch
3. 21,000 pounds per square inch
4. 21,400 pounds per square inch
5. 21,800 pounds per square inch
6. 22,200 pounds per square inch
7. 22,600 pounds per square inch In this instance the test specimens were subjected to 50,000 cycles instead of 100,000 cycles.

It will be noted that the foregoing stress values embrace the cusp C, Fig. 3, which falls approximately at 22,000 p. s. i., the first five values being below and the last two being above the 22,000 p. s. i. value. This so-called "pinpointing" of the endurance limit can be used directly, as the initial test, on materials if their approximate endurance limits are known as is sometimes the case.

After being stressed as indicated above, the specimens were placed in the dilatometers and measured under the same conditions as was the first set of specimens. The coefficients of expansion of the test specimens were then plotted against the stress values applied to each specimen as shown in Figure 4, which indicates that within the limits of the test the endurance value of 17ST4 Duralumin is 21,000 pounds per square inch as indicated at D. It will of course be obvious that by reducing the increments of stress applied to the various specimens the accuracy of the determination may be increased to any desired degree. However, for practical purposes the 400 pounds per square inch increment utilized in connection with the test just above mentioned and the results of which are shown in Figure 4, is sufficiently low.

In determining the endurance limit of 1090 steel as above-mentioned, specimens were again prepared of conventional shape, in this instance seven specimens being utilized. As before, the specimens were formed from a round rod having a turned down central section 2 inches in length and of a diameter of 7/32 inch. The seven specimens were stressed in reversed torsion for 50,000 cycles, the first specimen having a stress of 20,000 pounds per square inch applied thereto, the second specimen a stress of 21,000 pounds per square inch, the third specimen a stress of 22,000 pounds per square inch, the fourth specimen a stress of 23,000 pounds per square inch, the fifth specimen a stress of 24,000 pounds per square inch, the sixth specimen a stress of 25,000 pounds per square inch, and the seventh specimen a stress of 26,000 pounds per square inch.

The test specimens were then placed in a standard electric circuit in an air-conditioned room and their electrical resistance value determined. These values were found to be as follows:

Specimen No. 1—0.0004255 ohms
Specimen No. 2—0.0004273 ohms
Specimen No. 3—0.0004307 ohms
Specimen No. 4—0.0004102 ohms
Specimen No. 5—0.0004254 ohms
Specimen No. 6—0.0004316 ohms
Specimen No. 7—0.0004248 ohms It is obvious from observation of these values that were a curve to be plotted the dip therein would occur at 0.0004102 ohms. The specimen which possesses this resistance value was that specimen which was subjected to 23,000 pounds per square inch of reverse torsion and therefore the endurance limit (for 1090 annealed steel in reverse torsion) is approximately 23,000 pounds per square inch. In this instance it was not desired to determine the value more accurately than is represented by the 1000 pound increment of stress between the specimens. However should it be desired to obtain a more accurate value, additional specimens could be made and tested with increments of say 100 pounds per square inch, their resistance readings taken, and the stress determined within the limits of accuracy above indicated.

It should be mentioned here that the same series of 1090 annealed steel were studied by the thermal expansion method and yielded precisely the same result of 23,000 pounds per square inch.

While we have described particular apparatus and modifications thereof for making measurements of dilation and have likewise described the measurement of various physical properties to determine the endurance limit of solids stressed in the desired manners, it will be obvious that other apparatus for measuring linear thermal expansion may be utilized and that other properties than linear thermal expansion or electrical resistance may be used as a basis of determination and that these other values may be measured in any known suitable manner.

Further, in describing the testing of Duralumin and steel, the specimens were stated to have the stress applied through 50,000 and 100,000 cycles of reversed stress. Frequently, however, 10,000 cycles are sufficient especially when the material is relatively soft and therefore no limitation as to the number of cycles is to be implied.

Also in specifying the temperature range utilized in determining the coefficients of linear thermal expansion 80° C. was indicated as being a desirable range. However, the range may frequently be considerably lower and in many instances a range of 20° C. or less will be sufficient. The range utilized is determined to some extent by the degree of accuracy of measurement of the coefficient of linear thermal expansion which is desired. We wish, therefore, to be limited not by the description which was given solely for purpose of illustration, but on the contrary to be limited only by the claims granted to us.

What is claimed is:

1. The method of determining the endurance limit of a solid material when subjected to a definite type fatique stress or combinations of definite types of fatique stresses, which comprises, preparing a plurality of substantially identical test specimens of the material, subjecting said specimens without rupturing the same to substantially the same number of reversed cycles of fatigue stress of the type determined, each of the specimens being subjected to a different value of stress of said type, the stresses applied being arranged in an increasing incremental manner from one specimen to the next, and thereafter measuring the value of a physical property which is common to all specimens and which is responsive to the varying fatigue stress changes, the stress applied to the specimen, the value of the measured property of which decreases to the minimum point of the incremental series and then increases beyond such minimum value, being the desired endurance limit value of the material.

2. The method of determining the endurance limit of a solid material subjected to a particular type of fatigue stress or combinations of particular types of fatigue stresses, which comprises, preparing a plurality of substantially identical test specimens of material, subjecting said specimens without rupturing the same to substantially the same number of reverse cycles of the definite type of fatigue stress, the stress values being arranged in a series, the increments between values being arranged in an increasing incremental manner from one specimen to the next, the upper limit of the total range of said values being above the statically determined yield point of said material and the lower limit of the range being below the yield point, heating the specimens through a desired temperature range, and measuring the change in the length of each specimen, the stress applied to the specimen the measured length change of which decreases to the minimum point of the incremental series and then increases beyond such minimum value, being the desired endurance limit value of the material.

3. The method of determining the endurance limit of a solid material when subjected to a definite type of fatigue stress or combinations of definite types of fatigue stresses, which comprises, preparing a plurality of substantially identical test specimens of the material, subjecting each specimen without rupturing the same to not more than substantially 200,000 cycles of reverse stress of the type determined, each of the specimens being subjected to a different value of stress of said type, the stresses applied being arranged in an increasing incremental manner from one specimen to the next, and thereafter measuring the value of a physical property which is common to all specimens and which is responsive to the varying fatigue stress changes; the stress applied to the specimen, the value of the measured property of which decreases to the minimum point of the incremental series and then increases beyond such minimum value, being the desired endurance limit value of the material.

4. The method of determining the endurance limit of a solid material subjected to a particular type of fatigue stress or combinations of particular types of fatigue stress, which comprises, preparing a plurality of substantially identical test specimens of material, subjecting each specimen without rupturing the same to not more than substantially 200,000 cycles of reversed stress of the type determined, each of the specimens being subjected to a different value of stress of said type, the stress values being arranged in a series, the increments between values being substantially equal, the upper limit of the total range of said values being above the statically determined yield point of said material and the lower limit of the range being below the yield point, heating the specimens through a desired temperature range, and measuring the change in the length of each specimen, the stress applied to the specimen, the measured length change of which decreases to the minimum point of the incremental series and then increases beyond such minimum value, being the desired endurance limit value of the material.

5. The method of determining the endurance limit of a solid material subjected to a particular type of fatigue stress or combinations of particular types of fatigue stress, which comprises, preparing a plurality of substantially identical test specimens of material, subjecting said specimens without rupturing the same to substantially the same number of reversed cycles of the definite type stress, each of the specimens being subjected to a different value of stress of said type, the stress values being arranged in a series, the increments between values being substantially equal, the upper limit of the total range of said values being above the statically determined yield point of said material and the lower limit of the range being below the yield point, heating the specimens through a temperature range of from 1° C. to 100° C., and measuring the change in the length of each specimen; the stress applied to the specimen, the measured length change of which decreases to the minimum point of the incremental series and then increases beyond such minimum value, being the desired endurance limit value of the material.

6. The method of determining the endurance limit of a solid material subjected to a particular type of fatigue stress or combinations of particular types of fatigue stress, which comprises, preparing a plurality of substantially identical test specimens of material, subjecting each specimen without rupturing the same to not more than substantially 200,000 cycles of reversed stress of the type determined, each of the specimens being subjected to a different value of stress of said type, the stress values being arranged in a series, the increments between values being substantially equal, the upper limit of the total range of said values being above the statically determined yield point of the said material and the lower limit of the range being below the yield point, heating the specimens through a temperature range of from 1° to 100° C., and measuring the change in the length of each specimen, the stress applied to the specimen, the measured length change of which decreases to the minimum point of the incremental series and then increases beyond such minimum value, being the desired endurance limit value of the material.

7. The method of determining the endurance limit of a solid material subjected to a particular type of fatigue stress or combinations of particular types of fatigue stress, which comprises, preparing a plurality of substantially identical test specimens of material, subjecting said specimens without rupturing the same to substantially the same number of reversed cycles of the definite type stress, each of the specimens being subjected to a different value of stress of said type, the stress values being arranged in an increasing incremental manner from one specimen to the next, the upper limit of the total range of said values being above the statically determined yield point of said material and the lower limit of the range being below the yield point, heating the specimens through a desired temperature range, measuring the change in the length of each specimen, the stress applied to the specimen the measured length change of which decreases to the minimum point of the incremental series and then increases beyond such minimum value, being the desired approximate endurance limit value of the material, and then repeating all of the above mentioned steps with smaller increments of applied stress whose upper and lower limits embrace the cusp previously determined to thereby procure an accurate endurance limit value of the material.

8. The method of determining the endurance limit of a solid material subjected to a particular type of fatigue stress or combinations of particular types of fatigue stress, which comprises, preparing a plurality of substantially identical test specimens of material, subjecting said specimens without rupturing the same to not more than substantially 200,000 cycles of reversed stress of the type determined, each of the specimens being subjected to a different value of stress of said type, the stress values being arranged in an incremental manner from one specimen to the next, the upper limit of the total range of said values being above the statically determined yield point of said material and the lower limit of the range being below the yield point, heating the specimens through a desired temperature range, measuring the change in the length of each specimen, the stress applied to the specimen, the measured length change of which decreases to the minimum point of the incremental series and then increases beyond such minimum value, being the desired approximate endurance limit value of the material, and then repeating all of the above-mentioned steps with the increments of applied stress smaller than in the previous determination and whose upper and lower limits embrace the cusp previously determined to thereby procure an accurate endurance limit value of the material.

9. The method of determining the endurance limit of a solid material subjected to a particular type of fatigue stress or combinations of particular types of fatigue stress, which comprises, preparing a plurality of substantially identical test specimens of material, subjecting said specimens without rupturing the same to substantially the same number of reversed cycles of the definite type stress, each of the specimens being subjected to a different value of stress of said type, the stress values being arranged in an incremental manner from one specimen to the next, the upper limit of the total range of said values being above the statically determined yield point of said material and the lower limit of the range being below the yield point, heating the specimens through a temperature range of from 1° C. to 100° C., measuring the change in the length of each specimen, the stress applied to the specimen the measured length change of which decreases to the minimum point of the incremental series and then increases beyond such minimum value, being the desired approximate endurance limit value of the material, and then repeating all of the above-mentioned steps with the increments of applied stress smaller than in the previous determination and whose upper and lower limits embrace the cusp previously determined to thereby procure an accurate endurance limit value of the material.

10. The method of determining the endurance limit of a solid material subjected to a particular type of fatigue stress or combinations of particular types of fatigue stress, which comprises, preparing a plurality of substantially identical test specimens of material, subjecting said specimens without rupturing the same to substantially the same number of reversed cycles of the definite type stress, each of the specimens being subjected to a different value of stress of said type, the stress values being arranged in an increasing incremental manner from one specimen to the next, the upper limit of the total range of said values being above the statically determined yield point of said material and the lower limit of the range being below the yield point, measuring the initial length of each specimen, elevating the temperature of all specimens, and recording the length changes of each specimen arising from the increase in temperature; the stress applied to the specimen the measured length change of which decreases to the minimum point of the incremental series and then increases beyond such minimum value, being the desired endurance limit value of the material.

11. The combination set forth in claim 1 further characterized in that the physical property which is responsive to the varying fatigue stress changes constitutes the electrical resistance of the specimen material.

12. The combination set forth in claim 1 further characterized in that the physical property which is responsive to the varying fatigue stress changes constitutes the magnetic characteristics of the specimen material.

13. The combination set forth in claim 1 further characterized in that the physical property which is responsive to the varying fatigue stress changes constitutes the thermal expansion characteristics of the specimen material.

References Cited in the file of this patent

UNITED STATES PATENTS

| | | |
|---|---|---|
| 1,780,713 | McEwan | Nov. 4, 1930 |
| 1,888,755 | Barr et al. | Nov. 22, 1932 |
| 2,183,909 | Henderson | Dec. 19, 1939 |
| 2,198,041 | Peters | Apr. 23, 1940 |
| 2,307,492 | Davenport | Jan. 5, 1943 |
| 2,471,227 | Marshall | May 24, 1949 |

FOREIGN PATENTS

| | | |
|---|---|---|
| 685,106 | Germany | Dec. 16, 1939 |